United States Patent [19]
Ingram

[11] 3,960,012
[45] June 1, 1976

[54] SHAFT HORSEPOWER AND EFFICIENCY MONITORING SYSTEM

[76] Inventor: Maxwell Ingram, 15 Hamilton Ave., Dumont, N.J. 07628

[22] Filed: May 14, 1974

[21] Appl. No.: 469,900

[52] U.S. Cl............................................. 73/136 A
[51] Int. Cl.² ......................................... G01L 3/24
[58] Field of Search................... 73/136 A, 137, 138

[56] References Cited
UNITED STATES PATENTS

| | | | |
|---|---|---|---|
| 2,365,564 | 12/1944 | Langer............................. | 73/136 A |
| 2,949,029 | 8/1960 | Bayles et al...................... | 73/136 A |
| 3,041,874 | 7/1962 | Saxl .................................. | 73/136 A |
| 3,274,826 | 9/1966 | Ingram............................. | 73/136 R |
| 3,537,304 | 11/1970 | Brewer............................. | 73/136 A |
| 3,548,649 | 12/1970 | Parkinson ........................ | 73/136 A |

FOREIGN PATENTS OR APPLICATIONS

| | | | |
|---|---|---|---|
| 28,634 | 12/1906 | United Kingdom............... | 73/136 A |

*Primary Examiner*—Charles A. Ruehl
*Attorney, Agent, or Firm*—Imirie, Smiley & Linn

[57] ABSTRACT

A system for continuously providing direct readouts of horsepower and efficiency of a rotating shaft, which includes a husk assembly associated with the shaft and providing electrical signals proportional to shaft torque, a tachometer for providing electrical signals proportional to shaft rotational speed, electrical circuitry for electronically multiplying the torque signals by the RPM signals to determine shaft horsepower, and a dividing network for dividing the shaft horsepower signal into an electrical signal representing the rate of fuel consumption to provide a continuous indication of instantaneous system efficiency.

33 Claims, 11 Drawing Figures

FIG.6C

SHAFT HORSEPOWER AND EFFICIENCY MONITORING SYSTEM

BACKGROUND OF THE INVENTION

1. Field of the Invention

The present invention relates to horsepower indication and monitoring systems, and more particularly, to apparatus for continuously, electronically monitoring the horsepower being transmitted through a shaft as well as operating efficiency of the drive engine causing such rotation.

2. Description of the Prior Art

Numerous situations exist where a shaft is rotated by an appropriate drive mechanism to perform useful work. Exemplary of the same are electric power plants, industrial machine drive systems, propeller-driven ships, and the like. In all of these systems, and in fact in any system in which a powered prime mover causes the powered rotation of a driving shaft, it is extremely important to effectively monitor the horsepower being transmitted through the shaft as well as the overall efficiency of the system including the prime mover, the shaft, and the ultimate output assembly.

In connection with propeller-driven ships, it is extremely important that monitoring equipment simply, yet effectively provide accurate and continuous indications of the horsepower being transmitted through the ship's propeller shafts in order to enable the ship's operating personnel to obtain the optimum performance for developing the maximum output with the least consumption of fuel. While this may be a relatively minor task in connection with small pleasure craft, it becomes a substantial undertaking in connection with large commercial ships such as ocean liners, freighters and tankers. In these latter instances, measurements must be undertaken from one or more engines capable of producing many thousand horsepower and transmitting such power through propeller shafts often many city blocks long and weighing many tons. Yet, these measurements must be accurate, reliable and rapid.

The advantages in installing a shaft horsepower monitoring system are many. From the horsepower and the efficiency information data provided by such system, the operator can readily verify the ship's efficiency, potential faults, and system overloads so as to prevent damage to the assembly and to extend periods between costly overhauls. The data so obtained reduces operating costs, fuel consumption, down time and maintenance, thereby increasing both the ship's reliability and its overall efficiency.

It is also well known to those familiar with large scale propeller driven ships, that where such ships have two main propeller shafts, it is manifestly important that both propellers transmit exactly the same amount of power while underway. While RPM is often used as a close estimate of power being transmitted through the shaft, the same is at best an approximation since the actual amount of power being transmitted through the shaft is effected by many variables such as propeller efficiency, blade angle and diameter. Thus, especially with plural shafts, it is important to monitor the actual power being transmitted through the same since unequal power transmission will inherently cause power drive steering action which, thereafter, would have to be corrected by changing the rudder angle. This develops unnecessary power dissipation from rudder drag with corresponding waste of fuel.

It is also particularly desirable to examine the actual horsepower being transmitted through a ship's propeller during the conducting of sea trials for ship's performance. Large ships for both military and commercial applications must undergo rigorous sea trials at which time data pertaining to virtually every phase of ship's operation is compiled and analyzed before required certification is issued. In these instances, apparatus is necessary to effectively monitor, on a continual basis, the horsepower and fuel consumption efficiency of the ship's power plant while at the same time allowing a permanent recording of such obtained data to be made.

While the prior art, as exemplified by my U.S. Pat. No. 3,274,826, is generally cognizant of systems for directly enabling readout of shaft horsepower, such systems have proven to be only partially satisfactory. This is due to the fact that such systems are typically quite complex, include mechanical sub-systems and/or servo feedback loops, are very costly, are slow responding, are comparatively large, require a null-balance system with wearable precision potentiometers and rotating mechanical members, and cannot be manufactured by integrated, electronic circuit techniques. Thus, a versatile, economical and fully effective monitoring system to meet the needs of today's marine engineer as well as others concerned with the transmission of power through rotating shafts has heretofore been unavailable.

SUMMARY OF THE INVENTION

It is, therefore, a primary object of the present invention to continuously, accurately, and effectively determine and provide a perceptible readout of the actual horsepower output through the powered shaft of a prime mover, such as the propeller shaft of a ship, as well as overall system efficiency or fuel rate economy.

The present invention, in one aspect, can be summarized in that a system for determining the power being transmitted through a rotated shaft includes a first assembly coupled with the shaft for generating a direct current signal proportional to torque through said shaft, a second assembly coupled with the shaft for generating a direct current signal proportional to shaft RPM, and an electronic circuit connected to receive the generated direct current signals from the first and second assemblies, respectively, for electronically multiplying such signals to produce a direct current signal linearly representative of the horsepower actually being transmitted through the shaft.

Another object of this invention is to construct a totally electronic horsepower and efficiency monitoring system capable, at least in part, of integrated circuit fabrication.

The present invention has a further object in the monitoring and continuous calculation of instantaneous specific fuel rate of the prime mover of a rotated shaft.

Another object is to monitor a power rotated shaft system and to generate in response thereto analog and/or digital readout indications of shaft horsepower, as well as indications of totalized shaft horsepower-hours and graphical shaft horsepower versus time traces.

The present invention provides numerous improvements and advantages over the prior art in that all computations are electronic, direct, and automatic, that high precision readings are facilitated, that mechanical and servo-type mechanisms are eliminated, that indications of both shaft horsepower and instantaneous specific fuel rate are provided, that all readout measurements are extremely rapid, that over-torque and reverse torque indications are provided, and that the overall system is compact, light weight and economical to manufacture. Furthermore, the present invention is advantageous in that the same is adaptable to modular construction, and includes a husk assembly for deriving torque input signals, which husk assembly is light weight, is positively supported about a shaft to minimize vibration and shock, and may be constructed of non-ferromagnetic material allowing the use of electromagnetic pick-ups without disturbance.

These and other objects and advantages of the present invention will be more fully appreciated when taken in conjunction with the accompanying detailed description of a preferred embodiment and the attached drawings.

DETAILED DESCRIPTION OF THE INVENTION

While the present invention has utility in connection with any number of various systems in which it may be desired to determine, indicate, and record the shaft horsepower and/or instantaneous specific fuel rate of a prime mover driven rotated shaft, for exemplary purposes only the invention will be described and illustrated herein in conjunction with a preferred embodiment adapted specifically for use in connection with monitoring the propeller shaft of a ship. It is therefore to be understood that the present invention is not limited or restricted to any one particular system, but is intended for use generally for the purpose of determining the horsepower delivered by any powered shaft and the efficiency of the prime mover associated therewith.

Before proceeding with a detailed description of the preferred embodiment, it is believed helpful to briefly describe the theory of operation of the present system particularly as it relates to monitoring of propeller driven ships.

To fulfill the requirements in measuring shaft horsepower developed in the main shaft of an engine, namely, the propeller shaft in a ship, it is necessary to derive signals representative of the variables set forth in the shaft horsepower formula which reads as follows:

$$SHP = \frac{RPM \times \text{Torque (in lb. ft.)}}{5252}$$

wherein SHP equals shaft horsepower, RPM equals shaft revolutions per minute, and the figure 5252 represents a constant.

This formula represents the instantaneous readout of horsepower at any one moment, the horsepower output varying considerably from moment to moment with variations in torque or speed. In order to satisfy this equation, it is readily apparent that a monitoring system must be capable of deriving accurate signals indicative of both shaft RPM and shaft torque.

The present system derives a direct current signal representative of shaft RPM by means of a tachometer generator mechanically coupled to the shaft for detecting rotations thereof. The development of a signal representative of shaft torque is a somewhat more complex matter and consists essentially in the generation of a variable signal voltage proportional to propeller shaft twist resulting from the torque applied to the shaft by the prime mover. By modulating an oscillating signal in proportion to such detected torsional shaft flexure, and by demodulating the same to provide a direct current output signal, such signal may be accurately considered to represent actual torque experience by a shaft since the absolute value of torque is related to shaft flexure by a constant dependence upon the modulus of rigidity of the shaft, its size, and material employed in construction.

As is well known, the modulus of rigidity represents the ability of the shaft to resist the twisting forces developed by the torque exerted in the main shaft when an engine is driving the propeller to move the ship. Thus, once the modulus of rigidity, shaft diameter and shaft construction is known, the detected amount of twist, which is extremely small, that takes place in the shaft is directly proportional to the torque in a shaft and follows in a linear pattern over the range of torque applied for propulsion. In other words, the maximum torque does not normally exceed the elastic limits of the shaft.

Although the torque in a rotating member is in a circular direction, the amount of twist or flexure that takes place is so small that even though the precise measurement is along an arc on the shaft surface, no measurable error is introduced when this torsional shaft, flexure is evaluated as a linear displacement along a chord subtending this radial arc. This is due to several reasons. First, in large ships of the type for which the present system is primarily advantageous, the radius of propeller shaft is quite large when compared to the arc traversed during twisting. Second, when a linear variable differential transformer is used to detect actual movement, the same is unaffected by lateral shifting or rotating in directions other than the direction of the twist such that average resultant readngs are unchanged.

The modulus of rigidity in any particular shaft can be readily ascertained by known methods using specific weights to load the shaft and comparing actual twisting with modulus of rigidity tables provided by the shaft manufacturer and based upon the alloyed steel and type of heat treatment involved. Thereafter, by calibrating the flexure detection assembly, the direct current output signal provided by the same can be made directly proportional to and representative of actual shaft torque.

Since, as described above, the modulus of rigidity of any particular shaft may be readily computed, it is therefore only necessary to measure the magnitude of the twist in the shaft over a specific distance which reflects the torque under load. To accomplish this, the system in accordance with the present invention includes a husk assembly mechanically configured about the shaft and clamped to the shaft between two annular knife edges, one on each end. The husk assembly is laterally split at approximately its mid point such that the two sections thereof may be rotatably displaced with respect to each other in proportion to the degree of twisting exhibited within the length of shaft between the annular knife edges. As noted above, in accordance with the present invention, a direct current signal is generated in proportion to this detected twisting and fed along with the signal representative of shaft RPM to a solid state electronic multiplying network which generates, at an output, a signal representative of the product of these two variables. Accordingly, this output signal is directly and linearly proportional to shaft horsepower and can be used to drive any desired indicating network.

In addition to the foregoing, the signal derived by the multiplying circuit is also fed as the denominator to a dividing circuit, which receives at its numerator input a direct current signal proportional to the instantaneous rate of fuel flow. The dividing network is preferably constructed of solid state components either as a discreet or integrated network, and accurately and continuously computes a rate of fuel flow per shaft horsepower so as to indicate the instantaneous specific fuel rate or system efficiency of the apparatus under examination.

Figure 1:
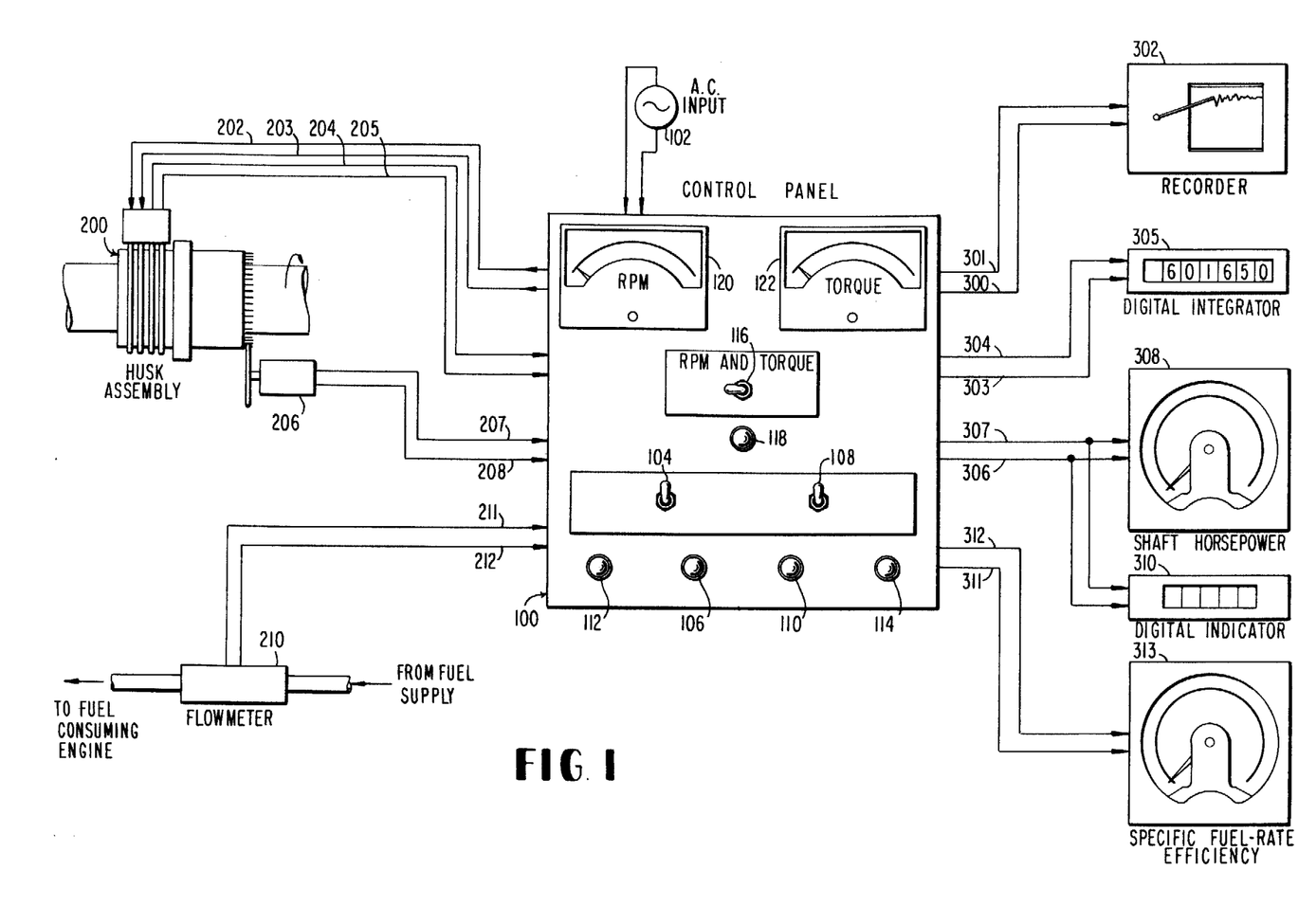
FIG. 1 is a diagrammatic view of a preferred embodiment of a shaft horsepower and efficiency monitoring system according to the present invention.

Turning now to FIG. 1, the same diagrammatically represents the overall system in accordance with the present invention and includes a control panel 100 housing all of the primary electrical circuitry, controls and indicator lamps, for operating the system. Power for the system is derived from a suitable source of AC operating potential 102 which is fed through an on-off control switch 104 to the rest of the circuit. A power indicator lamp 106 apprises an operator of the operating status of the system. The control panel also includes a switch 108 having a first position for normal system operation and a second position substituting preselected calibration signals to the systems meters. Positioning of switch 108 into the second position is indicated by appropriate alarm indicator 110 mounted on the panel next to switch 108.

An overtorque alarm lamp 112 and an astern torque indicator 114 are also mounted on the panel to inform the operator of these eventualities. Also, another switch 116 allows both RPM and torque signals to be reversed in polarity, reversal being indicated by an "astern" indicator lamp 118. RPM and torque meters 120 and 122, respectively, are calibrated for direct readout of the RPM and torque signals of the system, and may be used for system calibration.

Three distinct input signals are provided to the circuitry housed within the control panel 100. The first is derived from a husk assembly 200, which will be described in detail below. Husk assembly 200 receives regulated DC operating potential along lines 202 and 203 and applies the same through a brush and slipring assembly to a twist detection network which produces direct current signals on lines 204 and 205 representative of system torque.

Mechanically coupled to the rotating shaft at the husk assembly 200 is a tachometer generator 206 which provides a direct current output signal on lines 207 and 208 representative of shaft RPM. Also, a flow meter 210, of any suitable construction, is interposed in the main fuel supply line for the ships propulsion engine and delivers a DC output signal on lines 211 and 212 which is representative of the rate of fuel flow to the engine. The output signals on lines 204–205, 207–208, and 211–212, which are representative of torque, RPM, and fuel consumption, respectively, are all connected to the control panel assembly through appropriate interconnecting cables for subsequent electronic processing.

Circuitry in the control panel, as will be described more fully below, processes the input signals fed thereto so as to derive output signals representative of shaft horsepower and instantaneous specific fuel rate or efficiency. Signals representative of shaft horsepower are coupled via lines 300 and 301 to a strip chart recorder 302 which, as is well known, includes an elongated sheet of graph paper driven at a constant speed and cooperating with a pen moved in response to the amplitude of received signals to provide a permanent recording of variations in shaft horsepower vs. time. It is also noted that recorder 302 may contain any number of pens, with different colored ink, each being connected to receive input signals representative of the horsepower within plural shafts of the ship for providing a continuous permanent record of simultaneous horsepower readings of the plural shafts.

Ths shaft horsepower signal is also fed via lines 303 and 304 to a digital integrator 305 which integrates or totalizes such input signals and provides a direct digital readout of shaft horsepower-hours. This measurement is particularly useful in making long term analyses of overall system efficiency. For example, the totalized readout of the digital integrator 305 after one hour of ship operation may be divided into the number of pounds of fuel which were consumed during that hour to readily determine the average specific fuel rate during that period.

Of course, the shaft horsepower signals are in addition fed over lines 306 and 307 to an analog shaft horsepower indicator meter 308 having a calibrated dial for direct readout of shaft horsepower. While analog meter 308 is particularly advantageous when it is desired not only to readout shaft horsepower but to rapidly enable visual perception of shaft horsepower fluctuations with time, greater accuracy in actual shaft horsepower readout can be achieved by using any suitable digital indicator 310 either in parallel with or in lieu of the analog meter 308.

In addition to the above indicators, for providing various readouts of shaft horsepower, the control panel circuitry also electronically computes instantaneous specific fuel rate or system efficiency by electronically dividing the rate of fuel consumption signal by the shaft horsepower signal and generating a DC output signal in response thereto. This output signal is applied over lines 311 and 312 to a specific fuel rate indicator 313. The specific fuel rate indicator provides an analog readout of instantaneous specific fuel rate or system efficiency and includes two calibrated scales, with such calibration obtained by comparison of actual measured data with theoretical or expected readouts.

It is envisioned that the control panel as well as recorder 302, digital integrator 305, shaft horsepower meters 308 and/or 310, and specific fuel rate indicator 313 would all be mounted at a suitable control station within the ship's engine compartment. Since the ship's engineer is responsible for maintaining efficient operation of the main engines, the fact that all of the apparatus is located within the engine room effectively provides the engineer with the data necessary for him to accomplish the desired result. Of course, it may often be desired to provide additional indicators or meters directly at the ship's bridge especially on modern ships having direct bridge controls of the main engines.

Turning now to the details of the husk assembly 200, as shown in FIGS. 2 through 5, the same consists of first and second generally cylindrical portions 213 and 214 each in the form of a semi-circular half clamped together around the ship's propeller shaft 215. Each half section 213 and 214 is capable of moving independently free of the other half, and is rigidly fastened to the shaft 215 on their outside ends by annular knifeedge collars 216 and 217, respectively. Collars 216 and 217 are attached to the cylindrical husk portions 213 and 214 by any suitable means, such as by threaded fasteners, so that the overall assembly rotates with the shaft.

Figure 2:
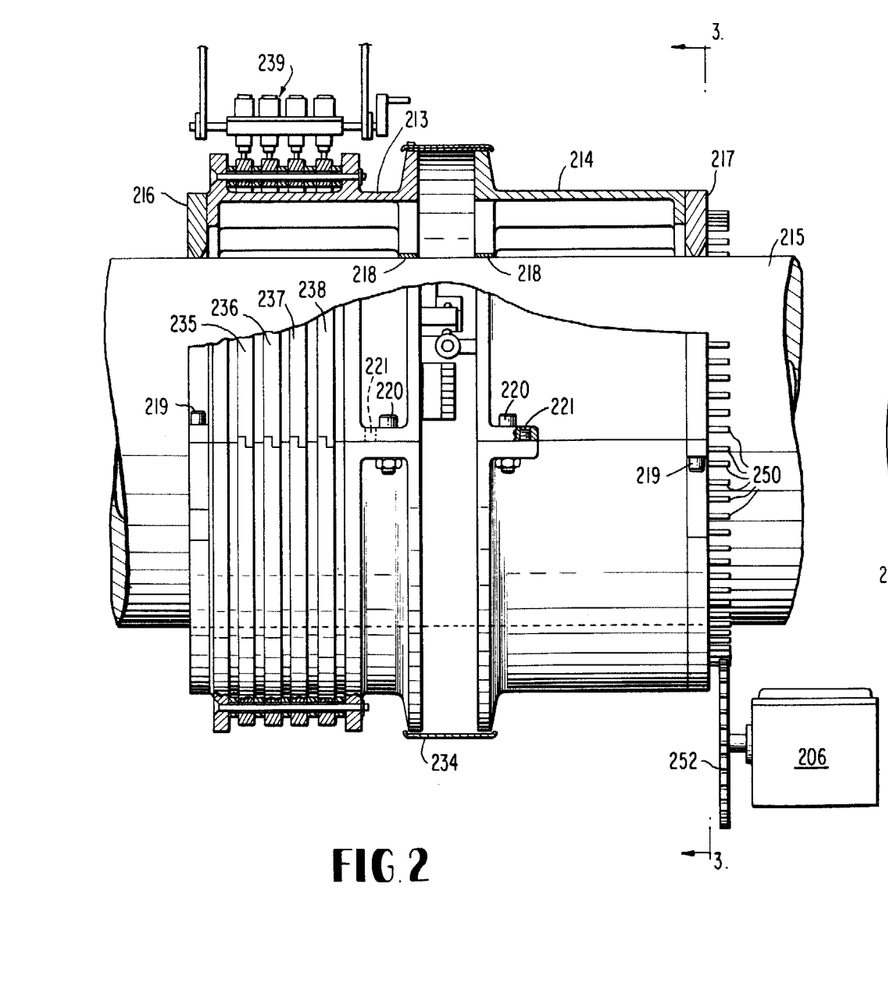
FIG. 2 is a side elevational view of the husk assembly of the system of FIG. 1, with parts broken away and parts illustrated in section.
Figure 3:
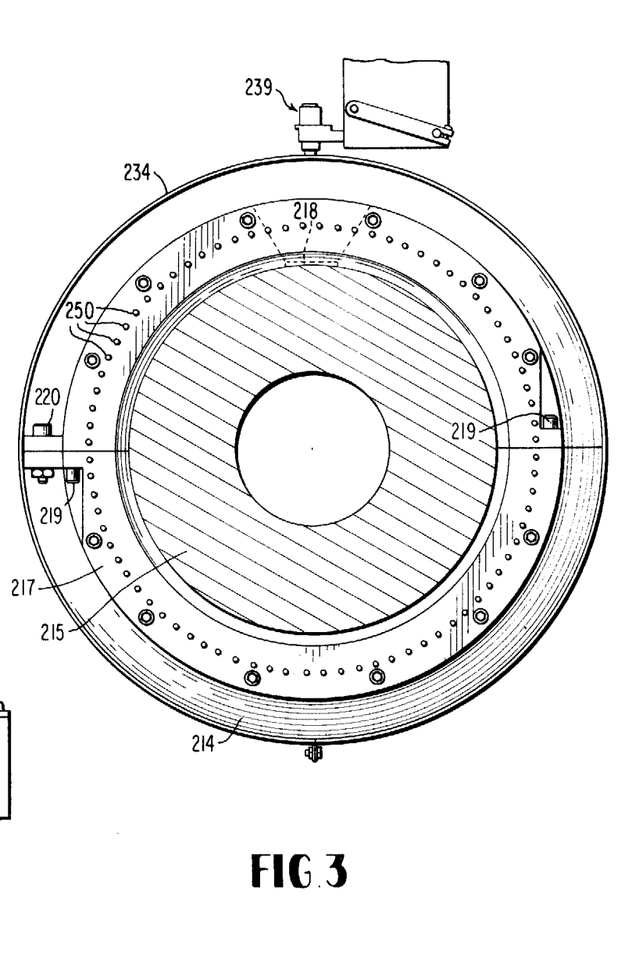
FIG. 3 is a sectional view taken on line 3—3 of FIG. 2.

Along the inner or adjacent peripheral boundaries of sections 213 and 214 are disposed a plurality of low friction bearing pads 218 extending from shell portions 213 and 214 so as to rest against the shaft surface. These bearing pads may be provided in the form of continuous bands or discreet sections, with approximately 12 sections peripherally disposed in equispaced arrangement being preferred. on initial installation, the husk assembly is disposed about the shaft and the semicircular halves thereof joined by suitable connecting bolts 219 and 220. Bolts 219 are then securely tightened in order to rigidly clamp the annular collars 216 and 217 against the shaft. On the other hand, bolts 220 are gently tightened and backed off so as to provide a very slight space between the bearing pads and the shaft surface. Spacing bolts 221 are then adjusted to maintain the bearing pad spacing, with bolts 220 subsequently securely tightened to complete the assembly.

Bearing pads 218 may be of any suitable construction exhibiting the characteristics of high mechanical strength and durability with low friction. Exemplary of such pads are those sold under the trademark Oilite and formed of sintered or powdered bronze filled with a lubricant such as oil.

Figures 4, 5:
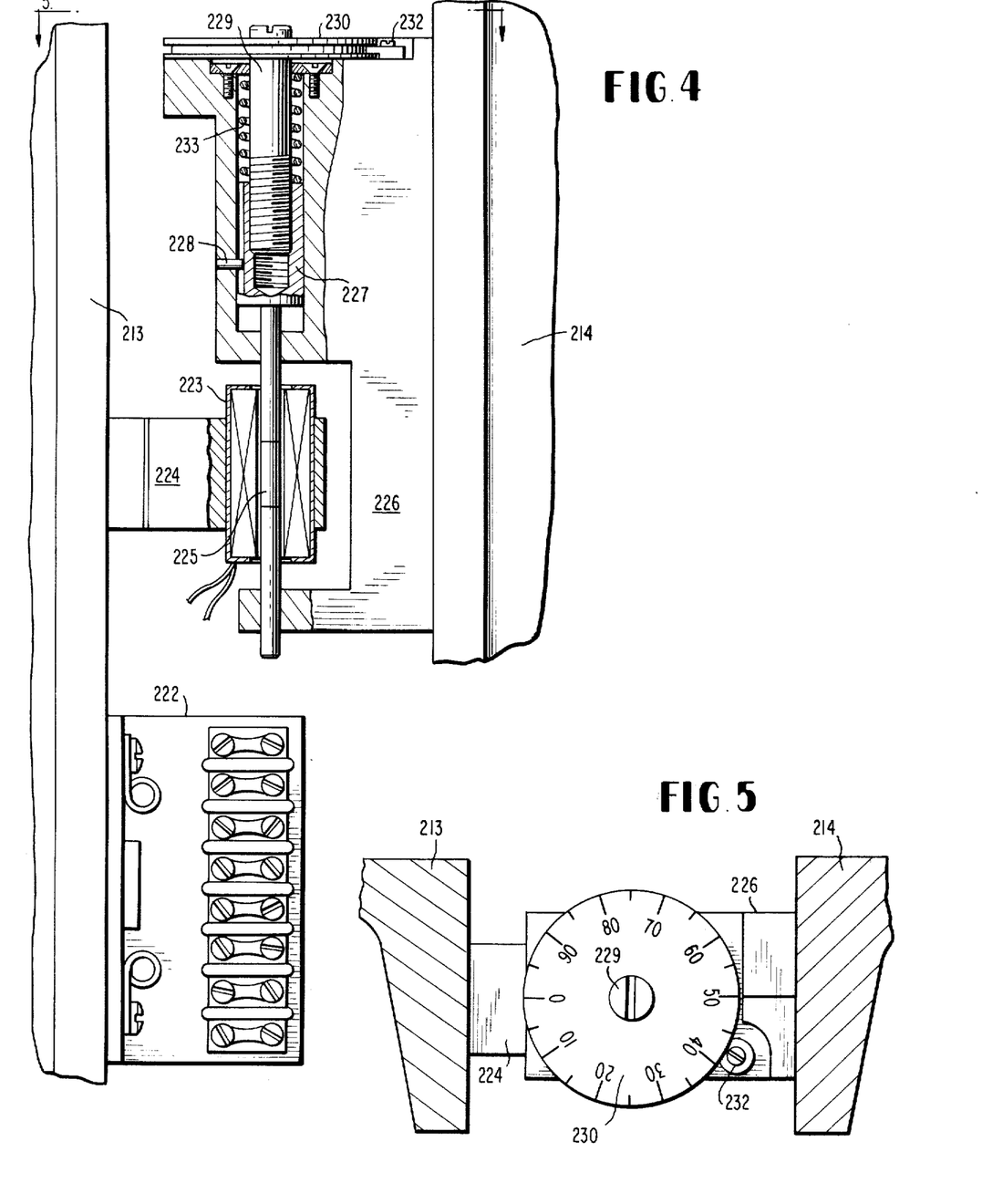
FIG. 4 is a detail view of the husk assembly of FIG. 2 with parts broken away and parts shown in section.
FIG. 5 is a partial elevational view, with parts in section, taken along line 5—5 of FIG. 4.

Temporary spacers, not shown, are used during the installation procedure to provide a gap or opening between the husk assemblies 213 and 214 for accommodating the torque detecting assembly illustrated in detail in FIGS. 4 and 5. This assembly includes a housing 222 containing the electrical circuitry illustrated in FIG. 7 and described below. Housing 222 is preferably carried upon a flange of husk assembly 213 and is electrically connected to a linear variable differential transformer 223. Transformer 223 is attached by a flange 224 to husk assembly 213 and cooperates with a soft iron core 225 slidably disposed in a housing 226 attached to husk section 214. In this manner, relative movement between husk assembly sections 213 and 214 due to twisting or torsional flexure of the shaft 215 will cause linear displacement of the core 225 with respect to the transformer windings 223.

Core 225 is attached to an internally threaded sleeve 227 slidably disposed in housing 226 and cooperating with a key 228 to preclude rotation. An adjusting bolt 229 is threadedly received within sleeve 227 and carries a circular scale 234 enabling calibration of the transformer. Bolt 229 and scale 230 are retained in the position illustrated in FIG. 4 by a retaining member 232 which also functions as a clamp to prevent the apparatus from going out of calibration. Within the lead screw housing is a compression spring 233 that continually presses against the female portion of the lead screw assembly in one direction so as to eliminate any backlash when reversing rotation of the screw thereby avoiding errors in calibration.

The transformer includes three coil windings to effect a change in voltage when the core is moved with regard to direction and magnitude. The three windings comprise a primary winding which induces power into the secondary windings and two secondary windings one each for the two directions of movement. When there is zero torque in the main shaft, the core is located at a mid point neutral position within the two secondary coil windings producing a zero differential voltage readout. This causes the provision of a null or a zero readout to indicate that the core is in a neutral position for zero torque.

The core in the transformer is made of soft iron which magnetically effects the transformation of current between the primary and secondary windings to produce the above noted readout. When there is an unbalance in the transformer due to displacement of the core, the magnitude of the voltage readout is the resultant output between the two opposing secondary coils, which is directly proportional to coaxial displacement of the coil within its housing. In practice, the core itself is only a portion of the shaft extending through the windings, the remaining sections of the shaft being formed of non-magnetic materials.

The lead screw 229 and calibration dial 230 are precisely machined for making accurate calibrations of the system. Calibration dial is used only when making zero adjustments and for determining the transformer ratio and its calibration figure while comparing it to the torque indicating meter readout. The formula for shaft deflection in lead screw dial divisions from torque only, with known modulus of rigidity, radius of the shaft, length of husk between clamping planes, and radius of transformer core is as follows:

$$\Delta = \frac{7980}{\pi} \times \frac{tlb}{c(r_1^4 - r_2^4)}$$

where delta equals the deflection in divisions on the shaft dial where the lead screw has a 0.025 inch pitch, $t$ equals torque in pound-inches, $l$ equals length between clamps 216 and 217, $b$ equals radius in inches (distance of transformer core from center), $c$ equals modulus of rigidity in pounds per square inch, $r_1$ equals radius to outside diameter of shaft in inches, and $r_2$ equals radius to inside diameter of shaft in inches (0 for a solid shaft).

The zero torque position can be set in using the lead screw and dial to average out the residual torque remaining in the shaft for both the ahead and astern torque meter readout by alternately "jacking" (putting torque into the shaft) the shaft in both these directions.

Turning back to FIGS. 2 and 3, an appropriate cover assembly 234 may encircle the gap between husk sections 213 and 214 to preclude the entry of dust and other foreign particles therebetween and may be attached by any suitable fastening means on one of the two husk sections. Husk section 213 also carries four sliprings 235, 236, 237, and 238 for cooperation with a brush assembly 239 of any well known construction. The brushes and sliprings cooperate to enable direct current input signals and direct current output signals to be communicated with the rotating husk assembly during operation of the ship.

The shaft speed is obtained by use of the direct current tachometer generator 206 which is coupled to and driven by the main shaft to develop a gradient of electrical voltage directly proportional to the speed in RPM. It is preferred that the generator 206 include a permanent magnet field which reverses the output polarity with respect to direction change in shaft rotation. As shown in FIG. 2, the generator is mounted adjacent the shaft and is connected thereto through gears so that it runs at a considerably higher speed than the main shaft RPM. Rather than using expensive large gears, incorporated onto one end of the husk steel plate 217 are embedded a plurality of steel pins which mesh with the teeth of a spur gear 252 attached to the generator shaft. The number of pins installed on the husk and the amount of teeth on the mating spur gear is a function of overall gear ratio to develop the proper voltage gradient with respect to the expected range of shaft speeds.

Figure 6A:
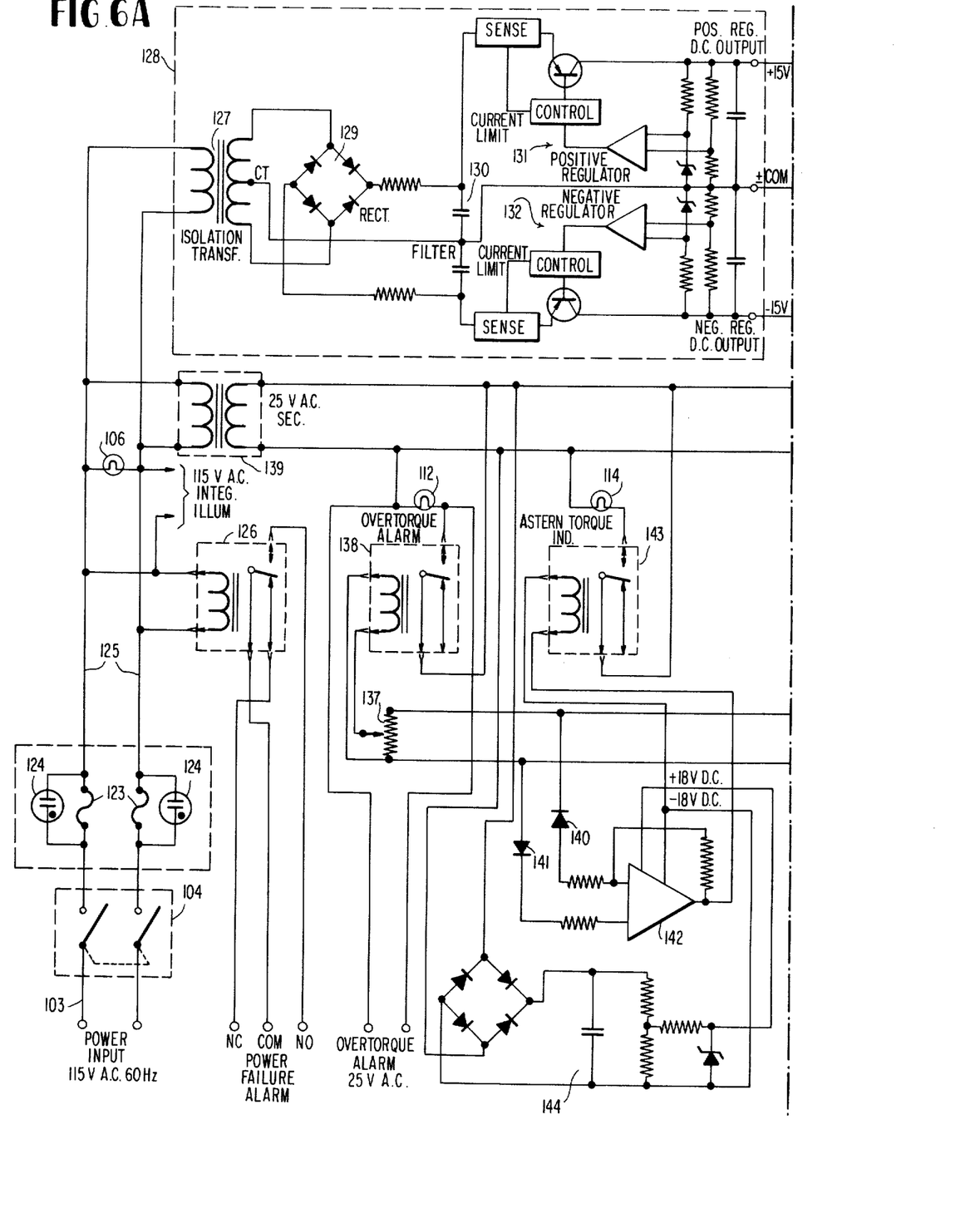
FIGS. 6A, 6B, and 6C are schematic diagrams which, taken together, illustrate the electrical circuit of the system according to the present invention.
Figure 6B:
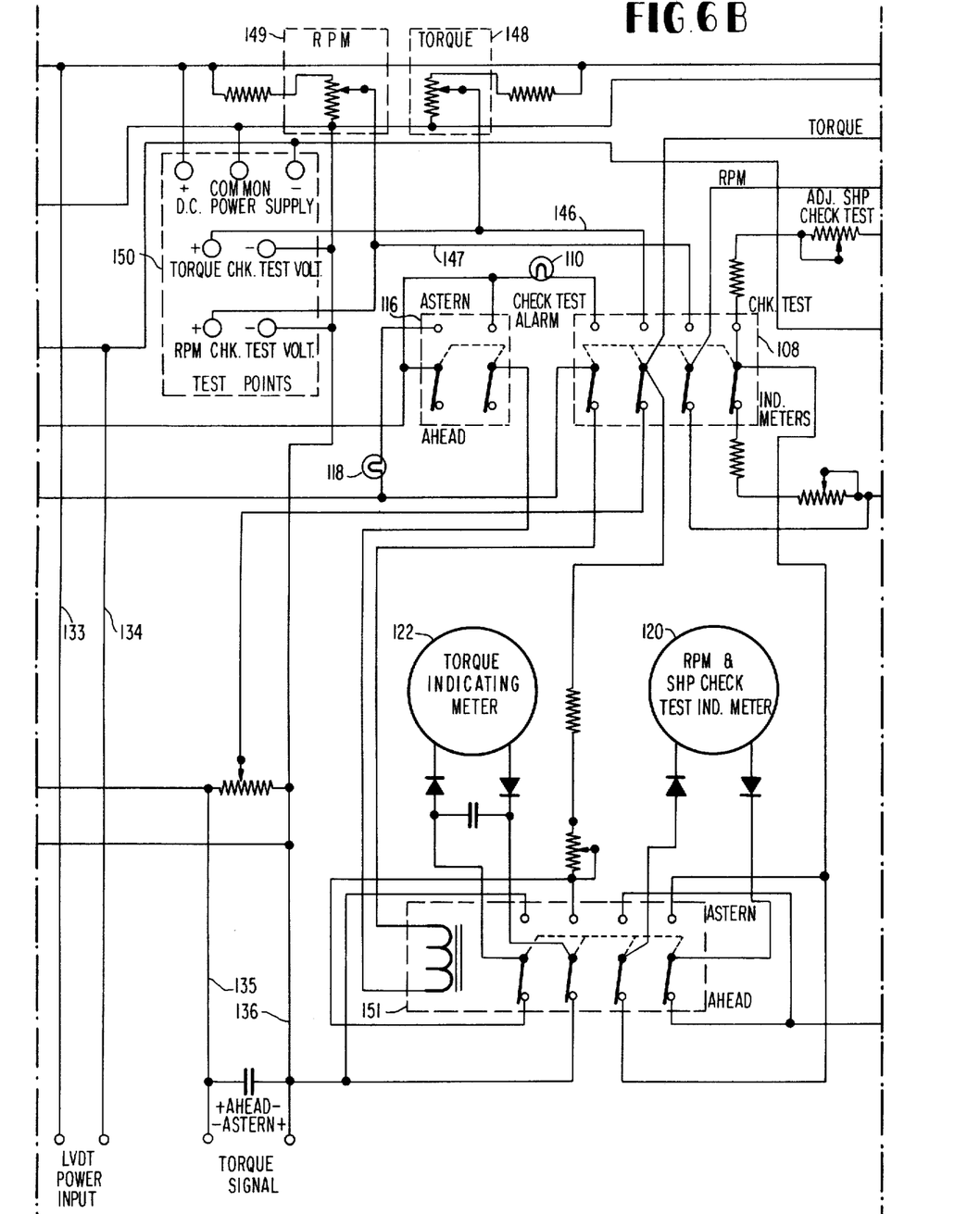
Figure 6C:
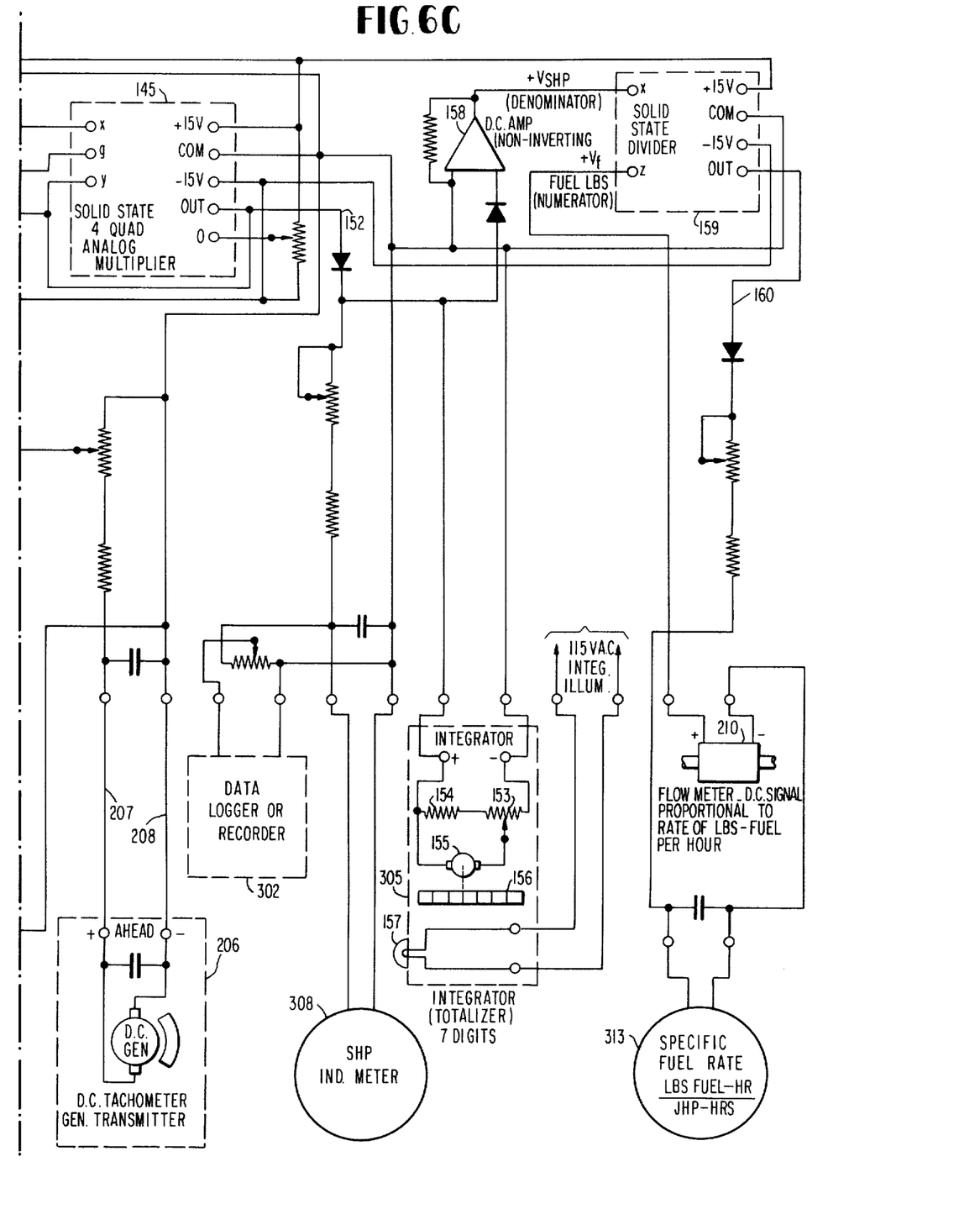

Turning now to FIGS. 6A, 6B, and 6C, power from AC source 102 is applied by lines 103 through power switch 104 to a pair of fuses 123. Neon indicator lamps 124 are connected in parallel with fuses 123 to indicate the occurrence of a blown fuse. The other side of the pair of fuses 123 is connected to main AC power lines 125 across which is connected on-off indicator lamp 106 and the coil of a power failure relay 126. Relay 126 includes appropriate normally open and normally closed connections for intercoupling with an external alarm to indicate power failure. Lines 125 are also connected to the input windings of an isolation transformer 127 in a voltage regulated DC power supply identified generally at 128. The output of transformer 127 is fed through a rectifier network 129 and a bank of filter condensers 130 to two identical solid state regulator networks 131 and 132. Three output terminals are therefore provided one supplying positive 15 volts DC, one supplying negative 15 volts DC and the other acting as common for both positive and negative terminals. Power supply 128 supplies a very accurately regulated DC output signal so as to facilitate accurate measurements within the system. The regulator 128 in cooperation with isolation transformer 127 effectively shields the entire system from inaccuracy and disturbances frequently encountered in the AC power supplies on board a ship.

The plus and minus 15 volt DC output terminals of the regulator 128 are respectively connected via lines 133 and 134 to two of the brushes of the husk assembly. As will be described below, the DC operating potential on lines 133 and 134 is fed to activate the circuitry within the husk assembly which thereafter generates a fluctuating DC signal fed through brushes to lines 135 and 136 and proportional to shaft torque. The torque DC signal, which is proportional in magnitude and polarity to the amplitude and direction of shaft torque, is fed over lines 135 and 136 to a potentiometer 137 which enables pre-selection of an over torque threshold for actuating the coil of an over torque relay 138. Over torque alarm lamp 112 is connected through the contacts of relay 138 across the secondary of a step-down transformer 139 so as to become energized upon receipt of a torque signal exceeding the preselected threshold.

The DC torque signal on lines 135 and 136 is also fed through diodes 140 and 141 to an operational amplifier 142 which in turn drives astern torque indicator rectifier 143. A relay and filter network 144 receives operating potential from the secondary of transformer 139 for providing a sufficiently high direct current potential to selectively actuate the coil of the astern torque indicator 143 under the control of amplifier 142. Lamp 114 of the control panel is connected across the secondary of transformer 139 through the contacts of relay 143 such that an output indication will be provided whenever a negative DC torque signal is generated by the husk assembly.

Output signals from the husk assembly on lines 135 and 136 as well as the output signals provided by the DC tachometer generator 206 on lines 207 and 208 are fed through suitable level setting potentiometers to the $x$ and $g$ inputs of a solid state 4 quadrant analog multiplier 145. The torque and RPM signals are supplied to the multiplier 145 through switch 108 which, in the position illustrated provides direct interconnection of the signals to the multiplier. In the check test position, switch 108 disconnects the input signals from the husk assembly and tachometer generator and substitutes therefor signals on lines 146 and 147, respectively from torque and RPM adjusting potentiometers 148 and 149, respectively connected to the power supply 128. In this manner, preselected or standardized test voltages may be readily and conveniently provided as inputs to the multiplier 145 for calibration and test purposes. The various signals including the power supply voltage, the torque check test voltage, and the RPM check test voltage may also be examined by external meter means via the test point panel 150 provided within the control panel.

Switch 116 is connected to supply the stepped down AC output of transformer 139 to the operating coil of a reversing relay 151. In the position illustrated, switch 116 isolates the coil of relay 151 from transformer 139 whereupon relay 151 assumes its normal or quiesent state as shown. In this state, torque and RPM signals on lines 135–136 and 207–208 are directly connected through conventional diode protection networks to the torque indicating and RPM indicating meters 122 and 120, respectively. When switch 116 is moved to its astern position, AC potential from transformer 139 is fed to the coil of relay 151 actuating the same and causing reversal of the connections to the torque and RPM indicating meters 122 and 120.

The leftmost pole of check test switch 108, as illustrated, is interposed in one side of the supply connections between transformer 139 and the coil of relay 151 such that transposition of the switch 108 to the check test position immediately causes relay 151 to revert to its normal or quiescent state regardless of the position of switch 116. After check test measurements and adjustments are made, and the switch 108 is moved back to its indicating position, the meters 122 and 120 are connected again in accordance with the ahead or astern position selected by switch 116. It is further noted that lamp 118 is connected across the output of transformer 139 through an additional set of contacts of switch 116 so as to become illuminated whenever switch 116 is in the astern position. Check test alarm lamp 110 is similarly connected through switch 108.

The output of the solid state multiplier 145 is fed by a line 152 to the data logger or recorder 302, the shaft horsepower indicator meter 308 and the digital integrator 305. Integrator 305 includes a potentiometer 153 connected in series with a resistor 154 across a DC motor 155. The output shaft of the DC motor 155, which rotates in proportion to the amplitude of the input potential drives a 7 digit decade counter 156. An illuminating lamp 157 is connected to the output of transformer 139 so as to facilitate visual perception of the totalized shaft horsepower-hours appearing on the decade counter 156.

The DC output signal on line 152, which is directly proportional to and is representative of shaft horsepower, is also applied through a DC amplifier 158 to the denominator input, X of a solid state divider network 159. The numerator input, Z of divider 159 receives the direct current output signal of the flow meter 210 whereupon the divider produces a DC output signal on line 160 which is representative of the instantaneous specific fuel rate or overall efficiency of the ship's propulsion system. The signal on line 160 is fed through a diode and potentiometer adjusting network to the specific fuel rate meter 313 so as to provide a continuous indication of instantaneous system efficiency during operation.

Both the multiplier network 145 and the divider network 159 are preferrably solid state modules fabricated by integrated circuit techniques. Moreover, these circuits accept direct current input signals and produce direct current output signals whereby problems associated with alternating current systems such as harmonics, phasing, impedence mismatching and quadrature-null complications are avoided.

Figures 7, 8, 9:
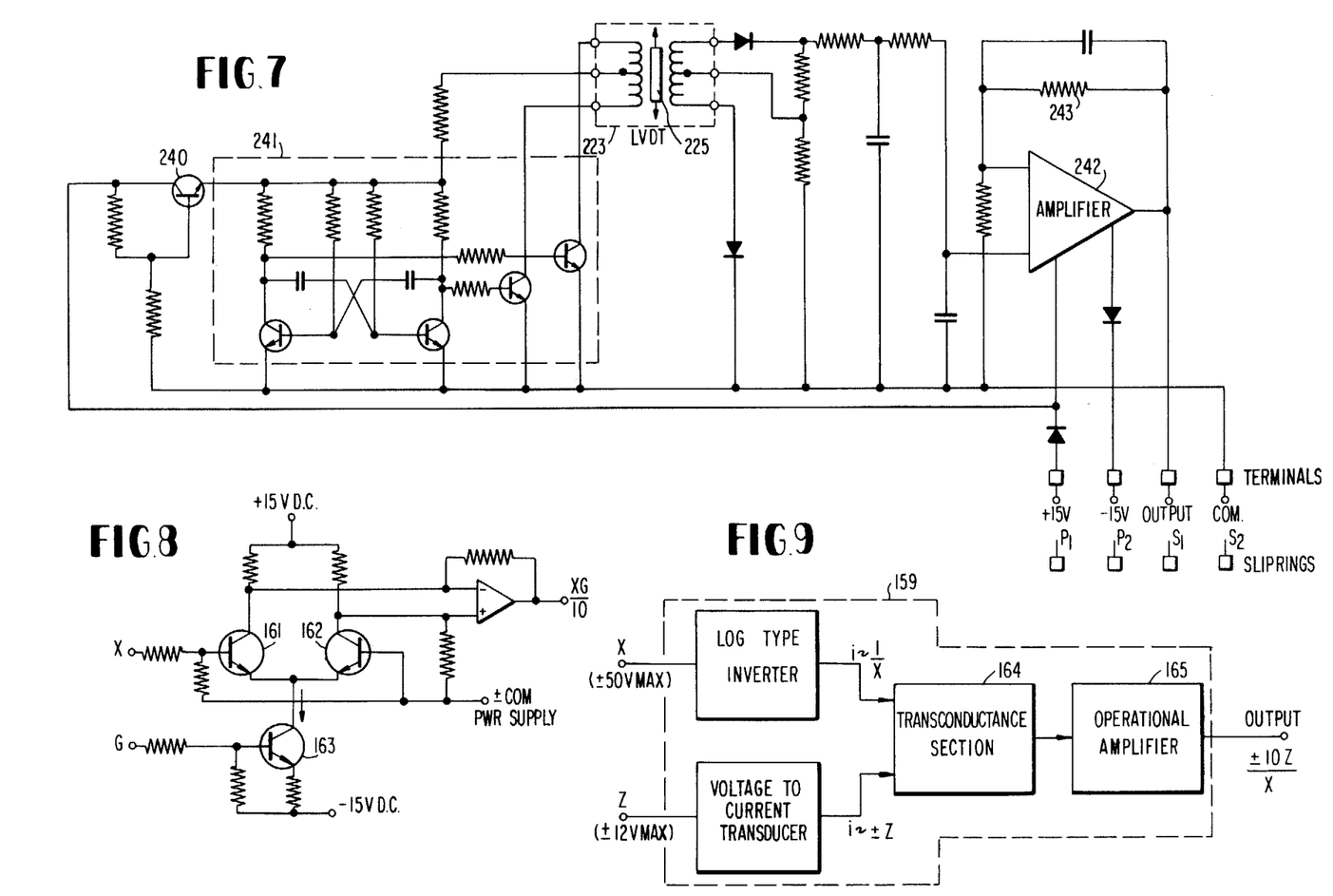
FIG. 7 is a schematic diagream of the electrical circuit of the husk assembly of FIG. 2.
FIG. 8 is a schematic diagram of the multiplier of the circuit of FIG. 6.
FIG. 9 is a block diagram of the divider network of the circuit of FIG. 6.

Referring now to FIG. 8, an exemplary circuit for multiplier 145 is shown and is of the variable transconductance type which exhibits extremely favorable characteristics with respect to reliability, stability, accuracy, linearity, temperature, gain, offset errors, and insensitivity to differences in input impedence. The multiplier is an analog device of the transconductance type for precision two or four quadrant application with adjustable gain and correction for offset. Since circuits of this general type are known to those of skill in the art, a detailed description will be omitted for the sake of brevity. However, it is noted that the variable transconductance multiplier of FIG. 8 produces the product of input signals by varying the transconductance of the transistors 161 and 162 so as to modulate the emitter current of transistor 163. Since the transconductance value of a transistor is proportional to the relative amount of collector current flowing therethrough, the voltage gain of a transistorized differential amplilfier can be varied in accordance with such emitter current. Therefore, the cooperative interaction of transistors 161, 162 and 163 results in the provision of an output signal directly related to the product of the two input signals applied to the network.

As shown in FIG. 9, the solid state divider network 159 is basically similar to the multiplier circuit of network 145 and, thus, is shown in block form only for exemplary purposes. The X and Z inputs to the divider 159 are applied respectively to a log type inverter and a voltage to current transducer which provide output signals to a transconductance section 164. The output of the transconductance section is applied through an operational amplifier 165 as the dividend of the division Z/X.

The husk assembly circuitry is shown in schematic form in FIG. 7 and includes a polarity reversal protecting transistor 240 which receives the direct current supply from the regulated power supply 128 and supplies operating power to an oscillator circuit 241 which utilizes a transistorized chopper to energize the primary winding of the linear variable differential transformer 223 with an alternating current having a frequency of between 2500 to 10,000 Hz. The coaxial position of the core 225 determines the gradient of voltage induced into each of the illustrated secondary windings. Each of the two secondary windings are connected to a demodulator which consists of two single rectifiers for half wave rectification terminating in an RC filter section. The secondary windings are connected in series for rectified voltage opposition so that the resulting differential between the two secondaries is a polarity selective direct current voltage proportional to the core displacement from the electrical null position. The differential output is connected to an operational amplifier 242 characterized in that the output of the amplifier has a polarity dependent upon which of the input terminals receives the higher positive polarity voltage. The amplifier 242 is thus both inverting and noninverting dependent upon the magnitude of the signals supplied as inputs thereto.

The magnitude of voltage amplification of amplifier 242 is dependent upon the resistance in the feedback resistor 243. Thus, the output of amplifier 242 is a voltage which is directly proportional to torque and the polarity is a function of relative core positioning with respect to a central position. The direct current output voltage signal of the amplifier 242 is then applied over lines 204 and 205 to leads 135 and 136 of the control panel. With shaft reversal, the RPM and torque polarities reverse but correspond to each other to produce upscale readouts.

Thus, it can be appreciated that the present invention provides a system for rapidly, effeciently, and effectively monitoring and examining the horsepower being transmitted through a rotating shaft as well as the specific fuel rate or efficiency of the overall system. This is extremely important in conjunction with the propulsion of large ships and satisfactorily resolves numerous problems experienced for considerable time in this art. It can be appreciated that the present system provides no mechanical or complex servo feedback loops, is readily adaptible to light weight, compact solid state integrated circuit fabrication, and relies upon DC signals throughout for increased accuracy and elimination of phasing and impedance mismatching problems. Furthermore, the husk assembly is particularly advantageous in that the main body section thereof is fabricated from rugged cast aluminum and has high strength steel clamping plates on the axial ends thereof where stresses are higheest. This arrangement provides light weight by using aluminum for the non-stressed section while the clamps have tight strength, durability, stability and ductility. This construction and assembly leads itself to lower costs and ease in machining, and assembly and substantially reduces the necessity for expensive replacement prevalent in conjunction with cast assemblies.

Also, by utilizing aluminum for the main body portions of the husk assembly, electromagnetic interference with the linear variable differential transformer is obviated to prevent disturbance in generated readout signals. The provision of lubricated bearing pads along the adjacent central peripheral edges of the husk assembly is also particularly advantageous as the same precludes vibration and shock wave disturbance during system operation.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A system for determining the power being transmitted through a rotated shaft, comprising:
    first means mounted on said shaft for generating a direct current signal having a magnitude proportional to torque transmitted through said shaft and a polarity corresponding to torque direction, said first means including a husk assembly clamped about said shaft;
    second means coupled with said husk assembly for generating a direct current signal having a magnitude proportional to shaft rotational speed and a polarity corresponding to rotation direction; and
    electronic circuit means having first and second inputs connected to receive said generated direct current signals from said first and second means, respectively and an output; said circuit means electronically multiplying said signals to produce a direct current signal at said output proportional in magnitude and polarity to the product of said first and second input signals whereby said direct current output signal is linearly representative of the horsepower being transmitted through said shaft in either forward or reverse directions.

2. The system as recited in claim 1 wherein said circuit means is a solid state circuit.

3. The system as recited in claim 1 including integrating means connected to receive the output signal from said circuit means for totalizing the same to provide an indication of shaft horsepower hours.

4. The system as recited in claim 3 wherein said integrating means includes an integrating motor driven by said output signal, said motor being coupled to rotate the input shaft of a decade counter.

5. The system as recited in claim 1 including recorder means connected to receive the output signal from said circuit means for providing a graphical readout of shaft horsepower versus time.

6. The system as recited in claim 5 wherein said recorder means has plural inputs and plural pens for providing simultaneous traces of horsepower versus time for plural shafts.

7. The system as recited in claim 1 including readout means connected to receive the output signal from said circuit means for providing a calibrated indication of shaft horsepower.

8. The system as recited in claim 7 wherein said readout means comprises an analog voltmeter.

9. The system as recited in claim 7 wherein said readout means comprises a digital voltmeter.

10. The invention as recited in claim 1 further including overtorque means connected to receive the output signal of said first means for producing an alarm indication in response to said signal exceeding a preselected threshold.

11. The invention as recited in claim 10 wherein said overtorque means includes switch means responsive to said threshold-exceeding signal for actuating an alarm device, and a potentiometer connected between said first means and said switch means to enable preselection of said threshold.

12. The invention as recited in claim 11 wherein said switch means comprises a relay, and wherein said alarm device is a lamp.

13. The invention as recited in claim 10 wherein said overtorque means produces said alarm indication in response to said signal exceeding said preselected threshold independent of the polarity thereof whereby overtorque in either direction is signalled.

14. The invention as recited in claim 1 further including reverse torque indicating means connected to receive the output signal of said first means for producing an alarm indication in response to said signal having a negative polarity.

15. The invention as recited in claim 14 wherein said reverse torque indicating means includes an indicator network, and a diode network coupled between said first means and said indicator network, said diode network supplying an actuating signal to said indicator network only when the polarity of said output signal of said first means is negative.

16. The invention as recited in claim 15 wherein said indicator network comprises a direct current power supply connected to an operational amplifier having quiescent and active states, and further comprises a relay controlled alarm device coupled to said operational amplifier, said operational amplifier being connected to said diode network and assuming said active state in responsee to the generation of said actuating signal for operating said alarm device.

17. The invention as recited in claim 16 wherein said alarm device is a lamp.

18. The system as recited in claim 1 wherein said first means includes an oscillator for generating an oscillatory signal, means coupled with said shaft and said oscillator for modulating said oscillatory signal in accordance with torsional flexure of said shaft, and a demodulator cooperating with said modulating means for generating said direct current output signal of said first means.

19. The system as recited in claim 18 wherein said modulating means comprises a linear variable differential transformer having an input winding coupled to said oscillator, an output winding coupled to said demodulator, and a core movable with respect to said input and output windings in accordance with said shaft flexure.

20. The system as recited in claim 18 wherein said oscillator and said demodulator are coupled to receive direct current operating potential and to provide said direct current output signal, respectively, through a plurality of spliprings and cooperating brushes. and the 21. The system as recited in claim 1 wherein said husk assembly includes a plurality of discrete axial protrusions equally spaced about the periphery of an end of said husk assembly and said second means comprises a tachometer generator mounted adjacent said husk assembly, and a gear wheel coupled with said tachometer generator, said gear wheel of said tachometer generator coacting with said protrusions whereby rotation of the shaft imparts rotary movement to said tachometer generator.

22. The system as recited in claim 21 wherein said protrusions comprise pins supported on an end wall of said husk assembly and at least partially protruding longitudinally therefrom.

23. A system for determining the power being transmitted through a rotated shaft, comprising:
first means coupled with said shaft for generating a direct current signal having a magnitude proportional to torque transmitted through said shaft and a polarity corresponding to torque direction;
second means coupled with said shaft for generating a direct current signal having a magnitude proportional to shaft rotational speed and a polarity corresponding to rotation direction; and
electronic circuit means having first and second inputs connected to receive said generated direct current signals from said first and second means, respectively, and an output; said circuit means electronically multiplying said signals to produce a direct current signal at said output proportional in magnitude and polarity to the product of said first and second input signals whereby said direct current output signal is linearly representative of the horsepower being transmitted through said shaft, wherein said first means and said circuit means are adapted to operate from a source of direct current operating potential; and wherein said system further includes input means adapted to be connected with a source of alternating current operating potential, and power supply means connected with said input means for converting said alternating current operating potential to regulated direct current for said first means and said circuit means.

24. The system as recited in claim 23 wherein said power supply means includes an isolation transformer coupled at an input to said input means and at an output through a rectifier network and a filter network to a direct current voltage regulator.

25. A system for determining the power being transmitted through a rotated shaft, comprising:
first means coupled with said shaft for generating a direct current signal having a magnitude proportinal to torque transmitted through said shaft and a polarity corresponding to torque direction;
second means coupled with said shaft for generating a direct current signal having a magnitude proportinal to shaft rotational speed and a polarity corresponding to rotation direction; and
electronic circuit means having first and second inputs connected to receive said generated direct current signals from said first and second means respectively, and an output; said circuit means electronically multiplying said signals to produce a direct current signal at said output proportional in magnitude and polarity to the product of said first and second input signals whereby said direct current output signal is linearly representative of the horsepower being transmitted through said shaft, a torque meter and polarity reversal means connected between said torque meter and said first means, said reversal means having a normal state connecting said torque meter for positive reading of the output signal of said first and actuable to an actuated state reversing said connection.

26. The system as recited in claim 25 further including test switch means interposed between (a) said first and second means and (b) said electronic circuit means for substituting first and second preselected test voltage signals for the output signals of said first and second means, respectively.

27. The system as recited in claim 26 wherein said test switch means is further coupled with said polarity reversal means to preclude the same from assuming said actuated state.

28. The system as recited in claim 25 wherein said polarity reversal means includes an indicator lamp energized when said reversal means is in said actuated state.

29. Apparatus for determining torque transmitted through a rotating shaft comprising:
a husk having two sections adapted to be fixedly secured to said shaft at longitudinally spaced points,
circuit means on said husk adapted to be connected with a source of direct current operating potential and responsive to movement of said husk sections relative each other for producing a direct current output signal proportional to torque transmitted through said shaft, said circuit means including as oscillator connected to receive said direct current operating potential for producing an alternating current signal, means cooperating with said oscillator for modulating the frequency of said alternating current signal in proportion to the degree and direction of relative movement between said husk sections, and a demodulator cooperating with said modulating means for producing said direct current output signal proportional to said relative movement, wherein said modulating means includes a linear variable differential transformer having an input winding connected to said oscillator, an output winding connected to said demodulator, and a core disposed in electromagnetic proximity of said input and output windings, said windings being mounted on one of said husk sections and said core being threadedly secured to the other of said husk sections whereby the position of said core relative said windings may be adjusted; and wherein said core is axially spring biased to maintain the threads thereof in positive contact thereby facilitating accurate adjustment.

30. The apparatus as recited in claim 29 wherein said circuit means is connected to a plurality of sliprings on said husk, and wherein said sliprings cooperate with a like plurality of brushes fixedly mounted adjacent said shaft.

31. In an apparatus for determining torque transmitted through a rotating shaft, a husk assembly comprising:
two annular steel collars adapted to be fixedly secured about the shaft at longitudinally spaced points, and
a hollow generally cylindrical shell laterally divided into first and second sections respectively connected to said two annular steel collars, and
means carried by said shell and responsive to relative circumferential movement between said first and second sections for producing a signal proportional to torsional flexure of said shaft such that said signal is representative of torque transmitted through said shaft, said first and second sections of said shell being supported upon said shaft along their adjacent edges by low friction bearing means and being connected to said annular steel collars along their opposite edges, and wherein each of said shell sections is split longitudinally into first and second halves; and further including for each of said shell sections a clamping bolt extending through said first and second halves adjacent said bearing means to secure said halves together, and a spacing bolt threadedly received in one of said halves and coacting with said other half to establish a minimum spacing therebetween.

32. The assembly as recited in claim 31 wherein said low friction bearing means for each section comprises a plurality of circumferentially spaced bearing pads.

33. The assembly as recited in claim 31 wherein said low friction bearing means are constructed of a sintered metal, lubricant filled material.

* * * * *